US011670015B2

(12) United States Patent
Liu et al.

(10) Patent No.: US 11,670,015 B2
(45) Date of Patent: Jun. 6, 2023

(54) METHOD AND APPARATUS FOR GENERATING VIDEO

(71) Applicant: Baidu Online Network Technology (Beijing) Co., Ltd., Beijing (CN)

(72) Inventors: Yunfeng Liu, Beijing (CN); Chao Wang, Beijing (CN); Yuanhang Li, Beijing (CN); Ting Yun, Beijing (CN); Guoqing Chen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/112,212

(22) Filed: Dec. 4, 2020

(65) Prior Publication Data

US 2021/0312671 A1    Oct. 7, 2021

(30) Foreign Application Priority Data

Apr. 2, 2020    (CN) .......................... 202010256117.1

(51) Int. Cl.
*G06T 11/00*    (2006.01)
*G06T 11/60*    (2006.01)
*G06V 40/16*    (2022.01)

(52) U.S. Cl.
CPC ............ *G06T 11/001* (2013.01); *G06T 11/60* (2013.01); *G06V 40/165* (2022.01); *G06V 40/171* (2022.01); *G06T 2207/30201* (2013.01)

(58) Field of Classification Search
CPC .................. G06T 11/001; G06T 11/60; G06T 2207/20221; G06T 2207/30201;
(Continued)

(56) References Cited

U.S. PATENT DOCUMENTS 10,803,646 B1 * 10/2020  Bogan, III ........... G06V 40/174
11,410,457 B2 *  8/2022  Savchenkov ............ G06N 3/04
(Continued)

FOREIGN PATENT DOCUMENTS

CN    105139438 A    12/2015
CN    108717719 A    10/2018
(Continued)

OTHER PUBLICATIONS

Li et al., "Guided Face Cartoon Synthesis," IEEE Transactions on Multimedia, vol. 13, No. 6, Dec. 2011, 10 pages.
(Continued)

*Primary Examiner* — Jin Cheng Wang
(74) *Attorney, Agent, or Firm* — Seed IP Law Group LLP

(57) ABSTRACT

Embodiments of the present disclosure provide a method and apparatus for generating a video. The method may include: acquiring a cartoon face image sequence of a target cartoon character from a received cartoon-style video, and generating a cartoon face contour figure sequence based on the cartoon face image sequence; generating a face image sequence for a real face based on the cartoon face contour figure sequence and a received initial face image of the real face, a face expression in the face image sequence matching a face expression in the cartoon face image sequence; generating a cartoon-style face image sequence for the real face according to the face image sequence; and replacing a face image of the target cartoon character in the cartoon-style video with a cartoon-style face image in a cartoon-style face image sequence, to generate a cartoon-style video corresponding to the real face.

11 Claims, 5 Drawing Sheets

(58) Field of Classification Search
CPC ........... G06K 9/00248; G06K 9/00268; G06K 9/00281; H04N 5/272; G09G 2340/12; G09G 2340/10; G09G 5/14
See application file for complete search history.

(56) References Cited

U.S. PATENT DOCUMENTS

| | | | |
|---|---|---|---|
| 2003/0212552 A1* | 11/2003 | Liang | G10L 15/25 704/231 |
| 2003/0212557 A1* | 11/2003 | Nefian | G10L 15/25 704/256.2 |
| 2007/0008322 A1 | 1/2007 | Ludwigsen | |
| 2009/0252435 A1* | 10/2009 | Wen | G06K 9/6257 382/284 |
| 2010/0245382 A1* | 9/2010 | Sio | G09G 5/14 345/593 |
| 2019/0122329 A1* | 4/2019 | Wang | G06T 3/0093 |
| 2019/0156574 A1* | 5/2019 | Fu | H04N 21/2187 |
| 2019/0171869 A1 | 6/2019 | Fortune et al. | |
| 2019/0197755 A1* | 6/2019 | Vats | G06T 13/80 |
| 2019/0332851 A1* | 10/2019 | Han | G06V 40/171 |
| 2020/0034996 A1* | 1/2020 | Qian | G06K 9/22 |
| 2020/0364838 A1* | 11/2020 | Liu | G06T 11/001 |
| 2020/0372692 A1* | 11/2020 | Ge | G06T 11/00 |
| 2021/0192703 A1* | 6/2021 | Wang | G06T 7/11 |
| 2021/0306557 A1* | 9/2021 | Voss | G06V 40/161 |

FOREIGN PATENT DOCUMENTS

| | | |
|---|---|---|
| CN | 109788312 A | 5/2019 |
| CN | 109993716 A | 7/2019 |
| CN | 110245638 A | 9/2019 |
| JP | 2002-8057 A | 1/2002 |
| WO | WO 2018018076 A1 | 2/2018 |

OTHER PUBLICATIONS

Li et al., "Everyone is a Cartoonist: Selfie Cartoonization with Attentive Adversarial Networks," 2019 IEEE International Conference on Multimedia and Expo (ICME), 2019, 6 pages.
Korean Office Action for Korean Application No. 10-2021-0038737, dated Jun. 29, 2022, 7 pages.
Japanese Office Action for Japanese Application No. 2020-202078, dated Jul. 12, 2022, 3 pages.
Huang, "Facial Replacement Technique in Image Based on Candide-3 Algorithm" *Computing Technology and Automation*, 37(2): 100-104, Jun. 2018.
Maejima, et al., "Automatic Face Replacement for a Humanoid Robot with 3D Face Shape Display" *12th IEEE-RAS International Conference on Humanoid Robots*, Osaka, Japan, Nov. 29-Dec. 1, 2012, 6 pages.

* cited by examiner

METHOD AND APPARATUS FOR GENERATING VIDEO

CROSS-REFERENCE TO RELATED APPLICATIONS

This application claims priority to Chinese Patent Application No. 202010256117.1, filed on Apr. 2, 2020, titled "Method and apparatus for generating video," which is hereby incorporated by reference in its entirety.

TECHNICAL FIELD

Embodiments of the present disclosure relate to the field of computer technology, and specifically to a method and apparatus for generating a video.

BACKGROUND

With the advancement of computer image processing technology, the technology of exchanging faces in pictures and videos is developing more and more rapidly. As an art form, cartoon refers to drawings describing life or current events by using simple but exaggerated techniques. Cartoons are very popular among the general public, especially among teenagers. The generation of a personalized cartoon video refers to that a face in an original cartoon video is converted based on a feature of the real face of a user to generate a personalized cartoon video possessing a face feature of the user. However, the production of images and videos of a cartoon character is not only time-consuming, but also requires high professional skills, which causes excessively high costs in producing a customized cartoon video by an ordinary user.

SUMMARY

Embodiments of the present disclosure provide a method and apparatus for generating a video.

In a first aspect, an embodiment of the present disclosure provides a method for generating a video, including: acquiring a cartoon face image sequence of a target cartoon character from a received cartoon-style video, and generating a cartoon face contour figure sequence based on the cartoon face image sequence; generating a face image sequence for a real face based on the cartoon face contour figure sequence and a received initial face image of the real face, where a face expression in the face image sequence matches a face expression in the cartoon face image sequence; generating a cartoon-style face image sequence for the real face according to the face image sequence; and replacing a face image of the target cartoon character in the cartoon-style video with a cartoon-style face image in the cartoon-style face image sequence, to generate a cartoon-style video corresponding to the real face.

In some embodiments, the generating a face image sequence for a real face based on the cartoon face contour figure sequence and a received initial face image of the real face includes: for a cartoon face contour figure in the cartoon face contour figure sequence, performing sequentially following operations of generating a face image: generating a first face image based on a current cartoon face contour figure and face feature information of the initial face image; and determining a face image for the real face based on the first face image; and generating the face image sequence for the real face using the determined face image.

In some embodiments, the determining a face image for the real face based on the first face image includes: generating an optical flow diagram based on at least two current face images finally determined; generating a second face image based on a current face image finally determined and the optical flow diagram; and generating the face image for the real face based on the first face image and the second face image.

In some embodiments, the generating a cartoon face contour figure sequence based on the cartoon face image sequence includes: for a cartoon face image in the cartoon face image sequence, performing a face keypoint detection on the cartoon face image, and generating a cartoon face contour figure based on detected face keypoints.

In some embodiments, the generating a cartoon-style face image sequence for the real face according to the face image sequence includes: inputting a face image in the face image sequence into a pre-established cartoon-style image generative model to generate a cartoon-style face image sequence for the real face, the cartoon-style image generative model being used to generate a cartoon-style face image according to a face image of the real face.

In a second aspect, an embodiment of the present disclosure provides an apparatus for generating a video, including: an acquiring unit, configured to acquire a cartoon face image sequence of a target cartoon character from a received cartoon-style video, and generate a cartoon face contour figure sequence based on the cartoon face image sequence; a first generating unit, configured to generate a face image sequence for a real face based on the cartoon face contour figure sequence and a received initial face image of the real face, where a face expression in the face image sequence matches a face expression in the cartoon face image sequence; a second generating unit, configured to generate a cartoon-style face image sequence for the real face according to the face image sequence; and a replacing unit, configured to replace a face image of the target cartoon character in the cartoon-style video with a cartoon-style face image in the cartoon-style face image sequence, to generate a cartoon-style video corresponding to the real face.

In some embodiments, the first generating unit includes: a performing subunit, configured to, for a cartoon face contour figure in the cartoon face contour figure sequence, perform sequentially preset operations of generating a face image, where the performing subunit comprises: an image generating module, configured to generate a first face image based on a current cartoon face contour figure and face feature information of the initial face image; and a determining module, configured to determine a face image for the real face based on the first face image; and a sequence generating subunit, configured to generate the face image sequence for the real face using the determined face image.

In some embodiments, the determining module is further configured to: generate an optical flow diagram based on at least two current face images finally determined; generate a second face image based on a current face image finally determined and the optical flow diagram; and generate the face image for the real face based on the first face image and the second face image.

In some embodiments, the acquiring unit is further configured to: for a cartoon face image in the cartoon face image sequence, perform a face keypoint detection on the cartoon face image, and generate a cartoon face contour figure based on detected face keypoints.

In some embodiments, the second generating unit is further configured to: input a face image in the face image sequence into a pre-established cartoon-style image generative model to generate a cartoon-style face image sequence for the real face, the cartoon-style image generative model being used to generate a cartoon-style face image according to a face image of the real face.

In a third aspect, an embodiment of the present disclosure provides a device, including: one or more processor; and a storage apparatus, storing one or more programs. The one or more programs, when executed by the one or more processors, cause the one or more processors to implement the method according to any implementation in the first aspect.

In a fourth aspect, an embodiment of the present disclosure provides a computer readable medium, storing computer programs. The programs, when executed by a processor, implements the method according to any implementation in the first aspect.

According to the method and apparatus for generating a video provided in the embodiments of the present disclosure, the cartoon face image sequence of the target cartoon character is first acquired from the received cartoon-style video, and the cartoon face contour figure sequence is generated based on the acquired cartoon face image sequence. Next, the face image sequence for the real face is generated based on the cartoon face contour figure sequence and the received initial face image of the real face. Then, the cartoon-style face image sequence for the real face is generated according to the face image sequence. Finally, the face image of the target cartoon character in the cartoon-style video is replaced with the cartoon-style face image in the cartoon-style face image sequence, to generate the cartoon-style video corresponding to the real face. It is implemented that the cartoon-style video corresponding to the real face is automatically generated based on the cartoon-style video and a single initial face image of the real face, thereby improving the generation efficiency of the cartoon-style video corresponding to the real face and simplifying the generation steps of the video.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining accompanying drawings and embodiments. It may be appreciated that the specific embodiments described herein are merely used for explaining the relevant disclosure, rather than limiting the disclosure. In addition, it should be noted that, for ease of description, only parts related to the relevant disclosure are shown in the accompanying drawings.

It should also be noted that embodiments in the present disclosure and the features in the embodiments may be combined with each other on a non-conflict basis. The present disclosure will be described below in detail with reference to the accompanying drawings and in combination with the embodiments.

Figure 1:
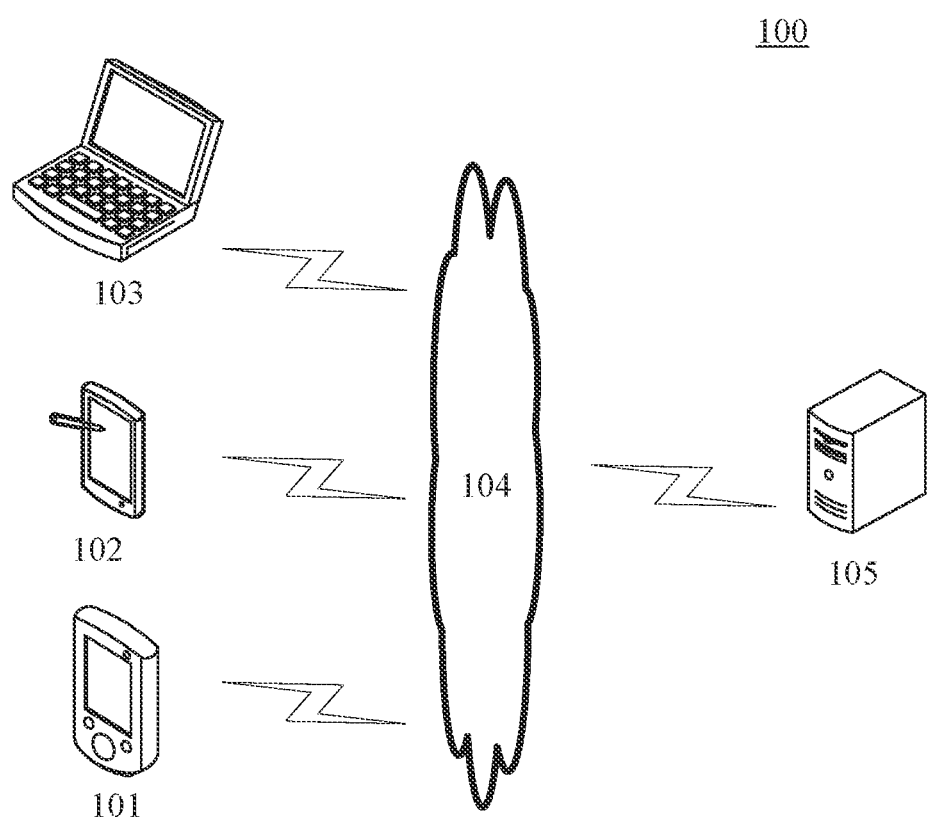
FIG. 1 is a diagram of an example system architecture in which an embodiment of the present disclosure may be applied.

FIG. 1 illustrates an example system architecture 100 in which a method for generating a video or an apparatus for generating a video according to an embodiment of the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104 to receive or send messages. Various communication client applications (e.g., image processing applications, video processing applications, web browser applications, shopping applications, search applications, instant communication tools, mailbox clients and social platform software) may be installed on the terminal devices 101, 102 and 103.

The terminal devices 101, 102 and 103 may be hardware or software. When being the hardware, the terminal devices 101, 102 and 103 may be various electronic devices having an image processing function, which include, but not limited to, a smart phone, a tablet computer, an MP4 (Moving Picture Experts Group Audio Layer IV) player, a laptop portable computer and a desktop computer. When being the software, the terminal devices 101, 102 and 103 may be installed in the above listed electronic devices. The terminal devices may be implemented as a plurality of pieces of software or a plurality of software modules (e.g., software or software modules for providing a distributed service), or as a single piece of software or a single software module, which will not be specifically defined here.

The server 105 may be a server providing various services. As an example, the server 105 may be a backend server providing a support for a video played on the terminal devices 101, 102 and 103. The backend server may perform processing such as analyzing on data such as a received cartoon-style video and a face image, and feed back a processing result (e.g., a generated video) to the terminal devices.

It should be noted that the server 105 may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the networks, and the servers in FIG. 1 are merely illustrative. Any number of terminal devices, networks, and servers may be provided based on actual requirements.

It should be noted that the method for generating a video provided by the embodiments of the present disclosure may be performed by the terminal devices 101, 102 and 103, or may be performed by the server 105. Correspondingly, the apparatus for generating a video may be provided in the terminal devices 101, 102 and 103, or may be provided in the server 105.

Figure 2:
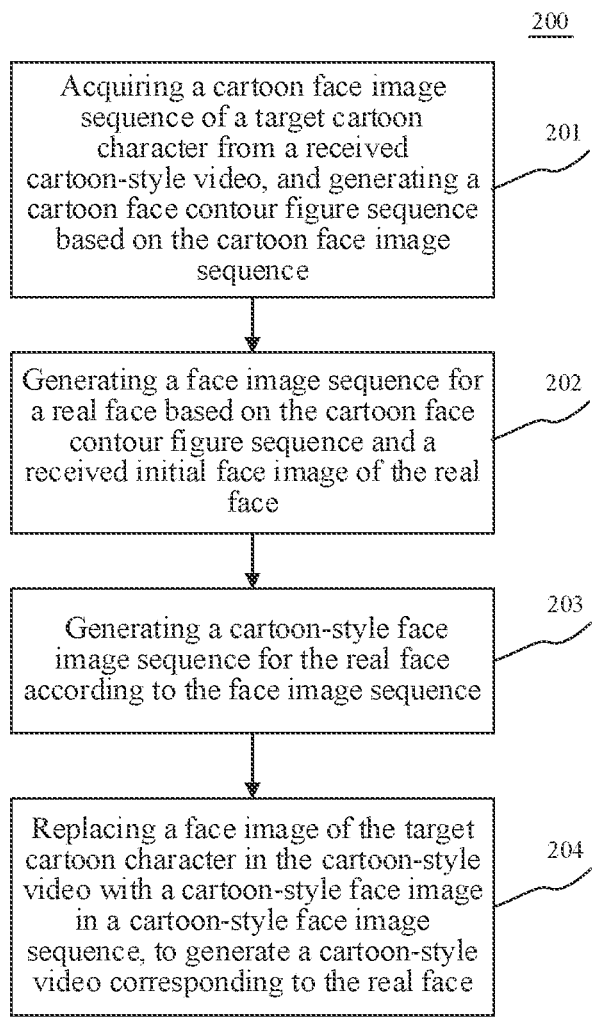
FIG. 2 is a flowchart of a method for generating a video according to an embodiment of the present disclosure.

Further referring to FIG. 2, FIG. 2 illustrates a flow 200 of a method for generating a video according to an embodiment of the present disclosure. The method for generating a video includes the following steps.

Step 201, acquiring a cartoon face image sequence of a target cartoon character from a received cartoon-style video, and generating a cartoon face contour figure sequence based on the cartoon face image sequence.

In this embodiment, an executing body (e.g., the terminal devices 101, 102 and 103 or the server 105 shown in FIG. 1) of the method for generating a video may first receive a cartoon-style video. Here, cartoon refers to the collection of animation and comics. For example, when the executing body is a terminal device, the executing body may directly receive a cartoon-style video sent by a user. When the executing body is a server, the executing body may receive a cartoon-style video from the terminal device used by the user, by means of a wired connection or a wireless connection. Thereafter, the executing body may acquire the cartoon face image sequence of the target cartoon character from the received cartoon-style video. Here, the target cartoon character may be a cartoon character pre-selected by the user. For example, the user may select the target cartoon character by clicking on a cartoon character or framing a cartoon character. In this way, the executing body may determine the target cartoon character from the cartoon-style video according to an operation (e.g., a click operation and a framing operation) of the user. Then, the executing body may perform screen capturing on a face image of the target cartoon character in the cartoon-style video, to form the cartoon face image sequence. Specifically, the executing body may perform a face detection on the cartoon-style video frame by frame, and capture a face image of the target cartoon character if the face image of the target cartoon character is detected. Finally, the executing body may perform a face contour detection and a face contour extraction on each cartoon face image in the cartoon face image sequence, to obtain the cartoon face contour figure sequence. As an example, the cartoon face contour figure may include information of the five sense organs of a target cartoon face.

In some alternative implementations of this embodiment, the generating a cartoon face contour figure sequence based on the cartoon face image sequence in step 201 may be specifically performed as follows: for a cartoon face image in the cartoon face image sequence, a face keypoint detection is performed on the cartoon face image, and a cartoon face contour figure is generated based on the detected face keypoints.

In this implementation, for each frame of cartoon face image in the cartoon face image sequence, the executing body may perform the face keypoint detection on the cartoon face image, and thus detects the face keypoints of the cartoon face image. Then, the executing body may connect the face keypoints representing the same organ to obtain the cartoon face contour figure corresponding to the cartoon face image.

Step 202, generating a face image sequence for a real face based on the cartoon face contour figure sequence and a received initial face image of the real face.

In this embodiment, the executing body may also receive a face image of the real face as the initial face image. Here, a face image of the real face may refer to a face image of a person in the real world, rather than a cartoon-style face image. Thereafter, the executing body may generate the face image sequence for the real face based on the cartoon face contour figure sequence obtained in step 201 and the initial face image. Here, the face expression in the face image sequence may be matched with (e.g., similar or identical to) the face expression in the cartoon face image sequence. For example, for each cartoon face contour figure in the cartoon face contour figure sequence, the executing body may adjust the five sense organs in the initial face image according to the information of the five sense organs in the cartoon face contour figure, to obtain a face image having a face expression matching the cartoon face contour figure for the real face.

Step 203, generating a cartoon-style face image sequence for the real face according to the face image sequence.

In this embodiment, the executing body may convert each face image in the face image sequence generated in step 202 into a cartoon-style face image in various ways, thereby obtaining the cartoon-style face image sequence for the real face. As an example, the face image may be converted into the cartoon-style face image by adjusting the color, the contrast, etc. of the face image.

In some alternative implementations of this embodiment, step 203 may be specifically performed as follows: a face image in the face image sequence is inputted into a pre-established cartoon-style image generative model to generate a cartoon-style face image sequence for the real face.

In this implementation, the executing body may input the each face image in the face image sequence generated in step 202 into the pre-established cartoon-style image generative model to generate a cartoon-style face image sequence for the real face. Here, the cartoon-style image generative model may be used to generate a cartoon-style face image according to a face image of the real face.

As an example, the cartoon-style image generative model may be a model trained and obtained based on a machine learning algorithm. For example, the cartoon-style image generative model may be a convolutional neural network, a deep neural network, etc. The cartoon-style image generative model may alternatively be a generative model included in a generative adversarial network (GAN). The generative adversarial network is inspired from the two-player zero-sum game (two-player game) in the game theory, and the two parties in the GAN model are respectively acted by the generative model and a discriminative model. The generative model captures the distribution of sample data, generates a sample similar to real training data, and pursues that the more like the real training data the sample is, the better the effect is. The discriminative model is a binary classifier that discriminates the probability that a sample is derived from the real training data (rather than the data generated by the generative model). Common discriminative models may include, but not limited to, a linear regressive model, a linear discriminant analysis, a support vector machine (SVM), a neural networks, and the like. Here, the generative model and the discriminative model may be trained at the same time. The discriminative model is fixed and a parameter of the generative model is adjusted. The generative model is fixed and a parameter of the discriminative model is adjusted. In this embodiment, the generative model generates a more and more realistic cartoon-style face image through continuous learning. The discriminative model enhances the capability of distinguishing the generated cartoon-style face image from the real cartoon-style face image, through continuous learning. Finally, through the confrontation between the generative model and the discriminative model, the cartoon-style face image generated by the generative model is close to the real cartoon-style face image and successfully "cheats" the discriminative model. Such a generative adversarial network may be used to improve the authenticity of the generated cartoon-style face image.

Step 204, replacing a face image of the target cartoon character in the cartoon-style video with a cartoon-style face image in a cartoon-style face image sequence, to generate a cartoon-style video corresponding to the real face.

In this embodiment, the executing body may replace the face image of the target cartoon character in the cartoon-style video with the cartoon-style face image in the cartoon-style face image sequence generated in step 203, to generate the cartoon-style video corresponding to the real face. Here, since the cartoon-style face image sequence for the real face is generated based on the cartoon face image sequence corresponding to the target cartoon character, the cartoon-style face image in the cartoon-style face image sequence for the real face corresponds to the cartoon face image in the cartoon face image sequence acquired in step 201 one by one. Therefore, the face image of the target cartoon character in the cartoon-style video may be replaced with the cartoon-style face image in the cartoon-style face image sequence.

Figure 3:
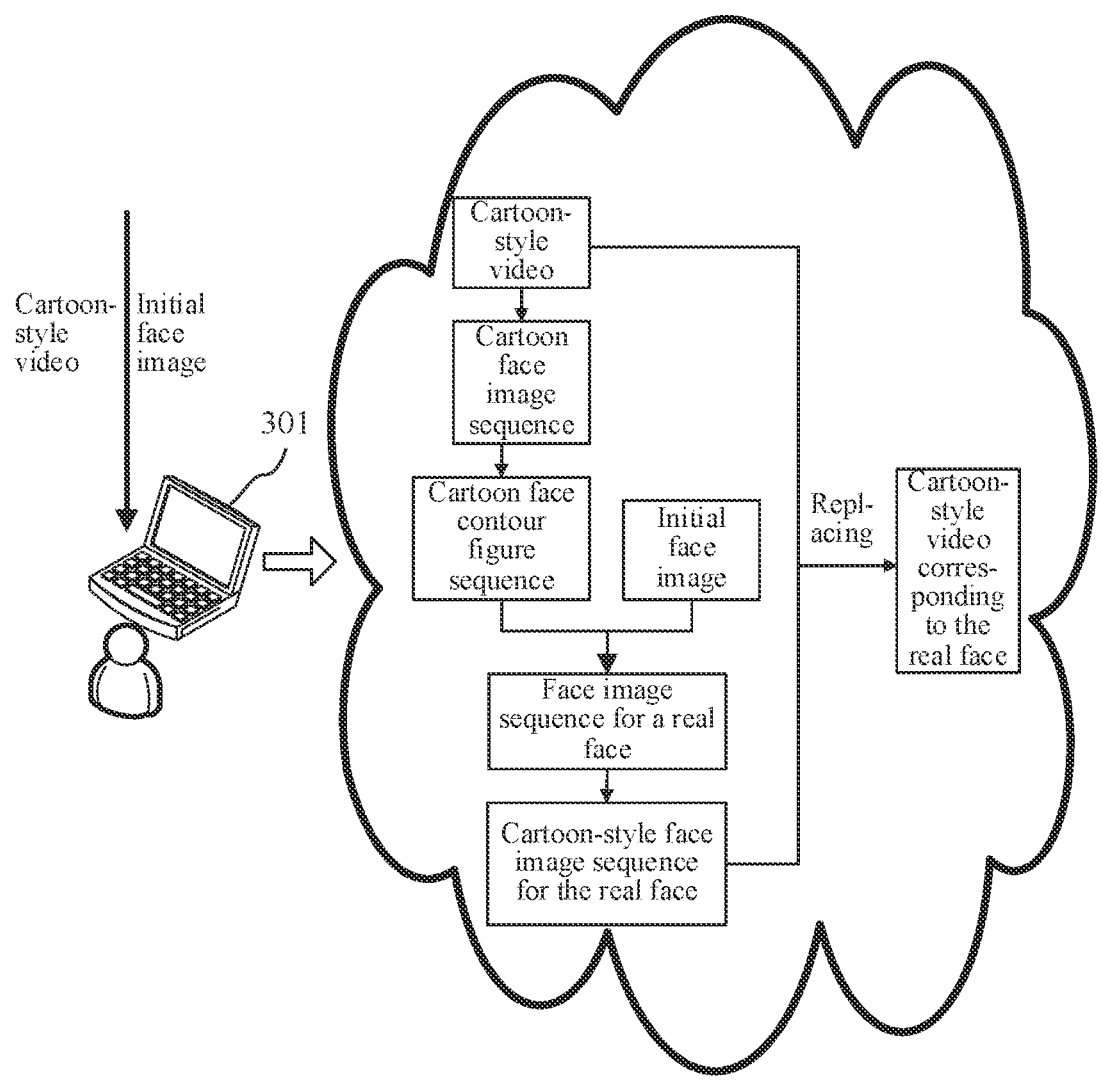
FIG. 3 is a schematic diagram of an application scenario of the method for generating a video according to an embodiment of the present disclosure.

Further referring to FIG. 3, FIG. 3 is a schematic diagram of an application scenario of the method for generating a video according to an embodiment. In the application scenario of FIG. 3, the terminal device 301 first acquires a cartoon face image sequence of a target cartoon character from a received cartoon-style video, and generates a cartoon face contour figure sequence based on the acquired cartoon face image sequence. Next, a face image sequence for a real face is generated based on the cartoon face contour figure sequence and a received initial face image of the real face. Then, a cartoon-style face image sequence for the real face is generated according to the face image sequence. Finally, the face image of the target cartoon character in the cartoon-style video is replaced with a cartoon-style face image in the cartoon-style face image sequence, to generate a cartoon-style video corresponding to the real face.

According to the method provided in the above embodiment of the present disclosure, the cartoon-style video corresponding to the real face may be automatically generated based on the cartoon-style video and a single initial face image of the real face, thereby improving the generation efficiency of the cartoon-style video corresponding to the real face and simplifying the generation steps of the video.

Figure 4:
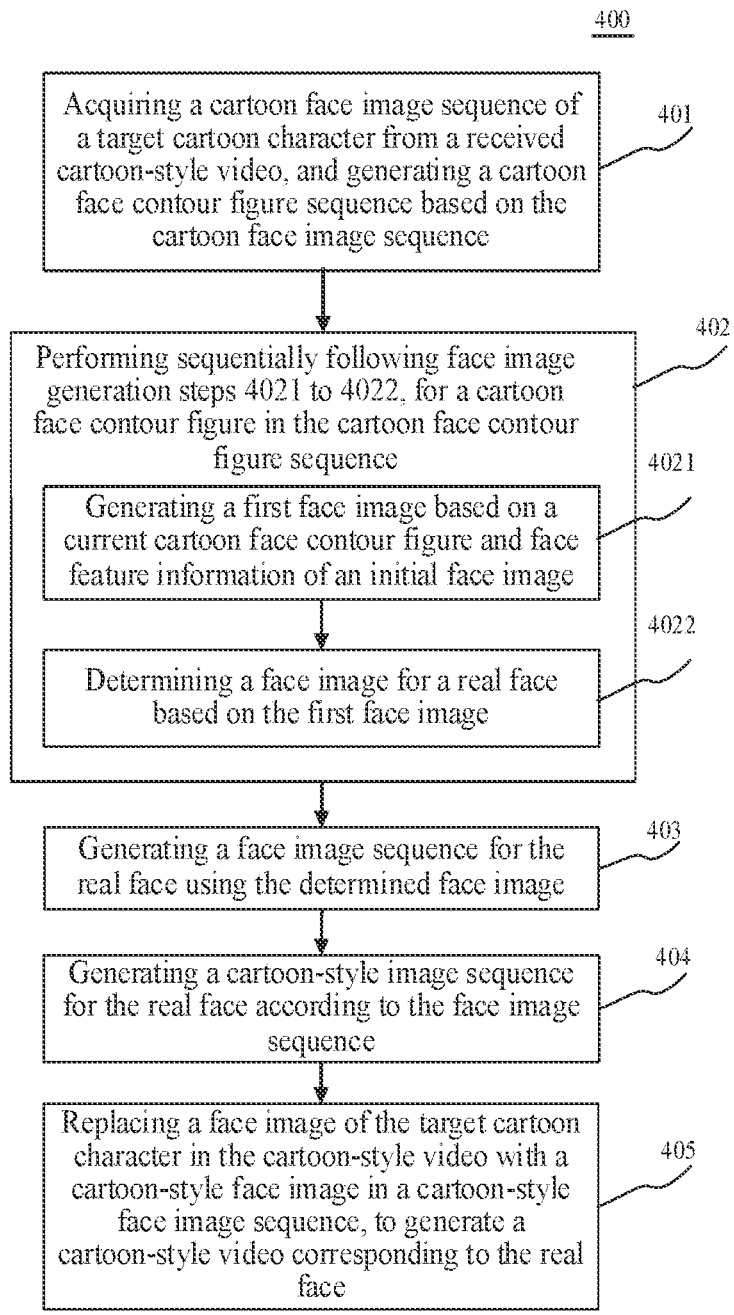
FIG. 4 is a flowchart of the method for generating a video according to another embodiment of the present disclosure.

Further referring to FIG. 4, FIG. 4 illustrates a flow 400 of the method for generating a video according to another embodiment. The flow 400 of the method for generating a video includes the following steps.

Step 401, acquiring a cartoon face image sequence of a target cartoon character from a received cartoon-style video, and generating a cartoon face contour figure sequence based on the cartoon face image sequence.

In this embodiment, step 401 is similar to step 201 of the embodiment shown in FIG. 2, which will not be repeatedly described here.

Step 402, performing sequentially following face image generation steps 4021 to 4022, for a cartoon face contour figure in the cartoon face contour figure sequence.

In this embodiment, for the cartoon face contour figure in the cartoon face contour figure sequence, the executing body may sequentially process the cartoon face contour figure according to the position of the cartoon face contour figure in the cartoon face contour figure sequence, and use the currently processed cartoon face contour figure as the current cartoon face contour figure. Here, the executing body may perform the steps 4021 to 4022 of generating the face image.

Step 4021, generating a first face image based on a current cartoon face contour figure and face feature information of an initial face image.

In this embodiment, the executing body may generate the first face image based on the current cartoon face contour figure and the face feature information of the initial face image. As an example, a first face generative model may be preset in the executing body. The first face generative model may be used to represent a corresponding relationship between a cartoon face contour figure, feature information and a generated face image. Here, the first face generative model may be trained and obtained based on a machine learning algorithm. For example, the first face generative model may be a convolutional neural network, a deep neural network, etc. As an example, the first face generative model may be trained and obtained based on the following steps. First, a first sample set is acquired. Here, a first sample includes a sample cartoon face contour figure, sample feature information and a sample generated face image. Here, the expression of the face in the sample generated face image matches the expression of the face corresponding to the sample cartoon face contour figure, and the face in the face image used when the sample feature information is extracted is the same as the face in the sample generated face image. Then, the sample cartoon face contour figure and the sample feature information in the first sample set are used as an input, the sample generated face image corresponding to the inputted sample cartoon face contour figure and the inputted sample feature information is used as a desired output, to train and obtain the first face generative model.

In this way, the executing body may generate the first face image based on the current cartoon face contour figure and the face feature information of the initial face image. For example, the executing body may input the current cartoon face contour figure and the face feature information of the initial face image into the first face generative model, and use the generated face image outputted by the first face generative model as the first face image.

Step 4022, determining a face image for a real face based on the first face image.

In this embodiment, the executing body may determine the face image for the real face based on the first face image generated in step 4021. As an example, the executing body may use the first face image as the face image for the real face. As another example, the executing body may directly use a preset number of first face images generated based on a preset number of previous (e.g., two previous) cartoon face contour figures in the cartoon face contour figure sequence as a preset number of previous face images for the real face. For a first face image generated based on a cartoon face contour figure except the preset number of previous cartoon face contour figures in the cartoon face contour figure sequence, the face image for the real face may be determined in other ways.

In some alternative implementations of this embodiment, step 4022 may be specifically performed as follows.

First, an optical flow diagram is generated based on at least two current face images finally determined.

In this implementation, for a first face image generated based on a cartoon face contour figure except the two previous cartoon face contour figures in the cartoon face contour figure sequence, the executing body may generate the optical flow diagram based on the at least two current face images finally determined. Here, the at least two current face images finally determined may refer to at least two face images that are finally determined based on the face image generation steps before the current moment.

As an example, the executing body may input the at least two current face images finally determined into a pre-established optical flow estimation model to obtain an optical flow diagram. Here, the optical flow estimation model may be used to generate an optical flow diagram based on at least two images. An optical flow expresses a change of an image and contains information of a target motion. As an example, the optical flow estimation model may be a model trained and obtained based on a machine learning algorithm, e.g., may be a convolutional neural network and a deep neural network. For example, the optical flow estimation model may also be a FlowNet, and an optical flow prediction is implemented by using a convolutional network. For example, the optical flow estimation model may be trained and obtained through the following steps. First, a training sample set is acquired. A training sample may include at least two face images for training and a optical flow diagram for training corresponding to the at least two face images for training. Here, the at least two face images for training may be face images of the same face acquired from consecutive frames of the same video, and the optical flow diagram for training contains motion information of the face. Then, the at least two face images for training of the training samples in the set of the training samples may be used as an input, and the optical flow diagram for training corresponding to the inputted at least two face images for training may be used as a desired output, to train and obtain the optical flow estimation model.

Then, a second face image is generated based on a current face image finally determined and the optical flow diagram.

In this implementation, the executing body may generate the second face image based on the current face image finally determined and the optical flow diagram. Here, the current face image finally determined may refer to the last face image determined through the face image generation steps before the current moment.

As an example, the executing body may input the current face image finally determined and the optical flow diagram obtained in the above step into a pre-established second face generative model, to generate the second face image. Here, the second face image generative model may be used to represent a corresponding relationship between a face image, an optical flow diagram, and a face image. That is, the second face image generative model may generate a next face image based on one face image and one optical flow diagram. As an example, the second face image generative model may be a model trained and obtained based on a machine learning algorithm, for example, a convolutional neural network and a deep neural network. For example, the second face image generative model may be trained and obtained through the following steps. First, a second sample set is acquired. Here, a second sample includes a second sample face image, a sample optical flow diagram containing motion information of a next face image of the second sample face image, and the next face image. Then, the second sample face image and the sample optical flow diagram in the second sample set are used as an input, and the next face image corresponding to the inputted second sample face image and the inputted sample optical flow diagram is used as a desired output, to train and obtain the second face image generative model.

Finally, the face image for the real face is generated based on the first face image and the second face image.

In this implementation, the executing body may generate the face image for the real face based on the first face image and the second face image. As an example, the executing body may perform a weighted fusion on the first face image and the second face image, to obtain the face image for the real face. In this implementation, since the optical flow diagram is used in the process of generating the face image, that is, the motion information between adjacent face images is retained, the generated face images may be more coherent, and the large shaking in the motion of the five sense organs of the face is not easily to occur.

Step 403, generating a face image sequence for the real face using the determined face image.

In this embodiment, the executing body may determine a plurality of face images, after sequentially processing each cartoon face contour figure in the cartoon face contour figure sequence based on the face image generation steps. The number of the determined plurality of face images is identical to the number of images included in the cartoon face contour figure sequence. The executing body may generate the face image sequence for the real face in a sequence in which the plurality of face images are determined.

Step 404, generating a cartoon-style image sequence for the real face according to the face image sequence.

In this embodiment, step 404 is similar to step 202 of the embodiment shown in FIG. 2, which will not be repeatedly described here.

Step 405, replacing a face image of the target cartoon character in the cartoon-style video with a cartoon-style face image in a cartoon-style face image sequence, to generate a cartoon-style video corresponding to the real face.

In this embodiment, step 405 is similar to step 204 of the embodiment shown in FIG. 2, which will not be repeatedly described here.

It may be seen from FIG. 4 that, as compared with the embodiment corresponding to FIG. 2, the flow 400 of the method for generating a video in this embodiment emphasizes the step of generating the face image for the real face based on the current cartoon face contour figure and the face feature information of the initial face image. Therefore, the face image generated in the solution described in this embodiment takes the cartoon face contour figure and the face feature information of the initial face image into comprehensive consideration, such that the face feature of the face corresponding to the initial face image is retained while the generated face image matches the face expression corresponding to the cartoon face contour figure.

Figure 5:
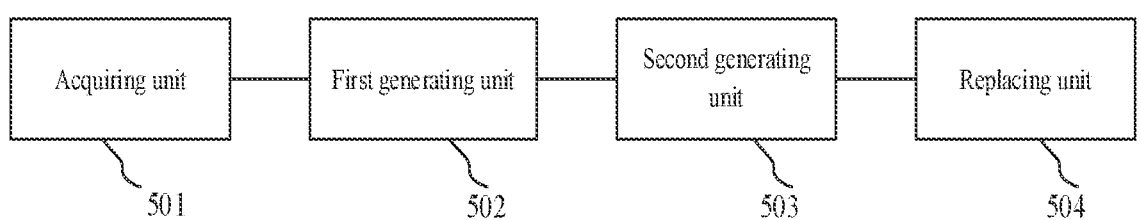
FIG. 5 is a schematic structural diagram of an apparatus for generating a video according to an embodiment of the present disclosure.

Further referring to FIG. 5, as an implementation of the method shown in the above drawings, an embodiment of the present disclosure provides an apparatus for generating a video. The embodiment of the apparatus corresponds to the embodiment of the method shown in FIG. 2, and the apparatus may be specifically applied to various electronic devices.

As shown in FIG. 5, the apparatus 500 for generating a video in this embodiment includes: an acquiring unit 501, a first generating unit 502, a second generating unit 503 and a replacing unit 504. The acquiring unit 501 is configured to acquire a cartoon face image sequence of a target cartoon character from a received cartoon-style video, and generate a cartoon face contour figure sequence based on the cartoon face image sequence. The first generating unit 502 is configured to generate a face image sequence for a real face based on the cartoon face contour figure sequence and a received initial face image of the real face, a face expression in the face image sequence matching a face expression in the cartoon face image sequence. The second generating unit 503 is configured to generate a cartoon-style face image sequence for the real face according to the face image sequence. The replacing unit 504 is configured to replace a face image of the target cartoon character in the cartoon-style video with a cartoon-style face image in a cartoon-style face image sequence, to generate a cartoon-style video corresponding to the real face.

In this embodiment, for specific processes of the acquiring unit 501, the first generating unit 502, the second generating unit 503 and the replacing unit 504 in the apparatus 500 for generating a video, and their technical effects, reference may be made to relative descriptions of step 201, step 202, step 203, and step 204 in the corresponding embodiment of FIG. 2 respectively, which will not be repeatedly described here.

In some alternative implementations of this embodiment, the first generating unit 502 includes: a performing subunit (not shown in the figure), configured to, for a cartoon face contour figure in the cartoon face contour figure sequence, perform sequentially preset face image generation steps. The performing subunit includes: an image generating module (not shown in the figure), configured to generate a first face image based on a current cartoon face contour figure and face feature information of the initial face image; and a determining module (not shown in the figure), configured to determine a face image for the real face based on the first face image. The first generating unit 502 further includes: a sequence generating subunit (not shown in the figure), configured to generate the face image sequence for the real face using the determined face image.

In some alternative implementations of this embodiment, the determining module is further configured to: generate an optical flow diagram based on at least two current face images finally determined; generate a second face image based on a current face image finally determined and the optical flow diagram; and generate the face image for the real face based on the first face image and the second face image.

In some alternative implementations of this embodiment, the acquiring unit 501 is further configured to: for a cartoon face image in the cartoon face image sequence, perform a face keypoint detection on the cartoon face image, and generate a cartoon face contour figure based on detected face keypoints.

In some alternative implementations of this embodiment, the second generating unit is further configured to: input a face image in the face image sequence into a pre-established cartoon-style image generative model to generate a cartoon-style face image sequence for the real face, the cartoon-style image generative model being used to generate a cartoon-style face image according to a face image of the real face.

Figure 6:
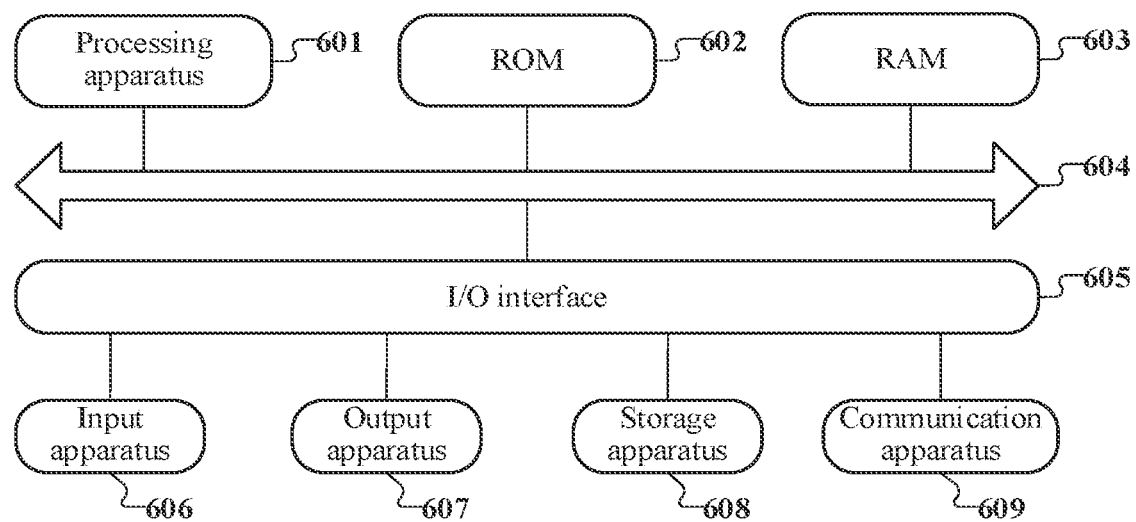
FIG. 6 is a schematic structural diagram of a computer system of an electronic device adapted to implement embodiments of the present disclosure.

Referring to FIG. 6, FIG. 6 is a schematic structural diagram of an electronic device 600 (e.g., the server or the terminal devices in FIG. 1) adapted to implement embodiments of the present disclosure. The electronic device shown in FIG. 6 is only an example, and should not bring any limitation to the functionality and the scope of use of the embodiments of the present disclosure.

As shown in FIG. 6, the electronic device 600 may include a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Typically, the following apparatuses may be connected to the I/O interface 605: an input apparatus 606 including a touch screen, touch pad, keyboard, mouse, camera, microphone, accelerometer, gyroscope and the like; an output apparatus 607 including a liquid crystal display (LCD), a speaker, a vibrator and the like; a storage apparatus 608 including a hard disk and the like; and a communication apparatus 609. The communication apparatus 609 may allow the electronic device 600 to communicate in a wired or wireless connection with other devices to exchange data. Although FIG. 6 illustrates the electronic device 600 having various apparatuses, it should be understood that it is not required to implement or have all of the illustrated apparatuses. More or less apparatuses may be alternatively implemented or possessed. Each block shown in FIG. 6 may represent one apparatus or may represent a plurality of apparatuses as desired.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, or may be installed from the storage apparatus 608 or from the ROM 602. The computer program, when executed by the processing apparatus 601, implements the above mentioned functionalities as defined by the method of the embodiments of the present disclosure.

It should be noted that the computer readable medium described by the embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the embodiments of the present disclosure, the computer readable storage medium may be any physical medium containing or storing programs which may be used by a command execution system, apparatus or element or incorporated thereto. While in the embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium including but not limited to: wired, optical cable, RF medium etc., or any suitable combination of the above.

The computer readable medium may be included in the above electronic device, or a stand-alone computer readable medium not assembled into the electronic device. The computer readable medium stores one or more programs. The one or more programs, when executed by the electronic device, cause the electronic device to: acquire a cartoon face image sequence of a target cartoon character from a received cartoon-style video, and generate a cartoon face contour figure sequence based on the cartoon face image sequence; generate a face image sequence for a real face based on the cartoon face contour figure sequence and a received initial face image of the real face, where a face expression in the face image sequence matches a face expression in the cartoon face image sequence; generate a cartoon-style face image sequence for the real face according to the face image sequence; and replace a face image of the target cartoon character in the cartoon-style video with a cartoon-style face image in the cartoon-style face image sequence, to generate a cartoon-style video corresponding to the real face.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquiring unit, a first generating unit, a second generating unit, and a replacing unit. Here, the names of these units do not in some cases constitute a limitation to such units themselves. For example, the first generating unit may also be described as "a unit configured to generate a face image sequence for a real face based on the cartoon face contour figure sequence and a received initial face image of the real face."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating a video, comprising:
    determining a target cartoon character from a received cartoon-style video according to an operation of a user, performing screen capturing on face images of the target cartoon character in the cartoon-style video to form a cartoon face image sequence for the target cartoon character, and generating a cartoon face contour figure sequence for the target cartoon character based on the cartoon face image sequence for the target cartoon character;
    generating a face image sequence for a real face based on the cartoon face contour figure sequence for the target cartoon character and a received initial face image of the real face, wherein a face expression in the face image sequence for the real face matches a face expression in the cartoon face image sequence for the target cartoon character;
    generating a cartoon-style face image sequence for the real face according to the face image sequence for the real face; and
    replacing face images of the target cartoon character in the cartoon-style video with cartoon-style face images in the cartoon-style face image sequence for the real face, to generate a cartoon-style video corresponding to the real face;
    wherein the generating of the cartoon-style face image sequence for the real face according to the face image sequence comprises:
        inputting a face image in the face image sequence into a pre-established cartoon-style image generative model to generate the cartoon-style face image sequence for the real face, wherein the cartoon-style image generative model is a model trained and obtained based on a machine learning algorithm, or a generative model included in a generative adversarial network (GAN), and the cartoon-style image generative model is used to generate a cartoon-style face image according to the face image of the real face;
    wherein the generating a face image sequence for a real face based on the cartoon face contour figure sequence for the target cartoon character and a received initial face image of the real face comprises:

for a cartoon face contour figure in the cartoon face contour figure sequence, performing sequentially following operations of generating a face image: generating a first face image based on a current cartoon face contour figure and face feature information of the initial face image;

determining a face image for the real face based on the first face image by: generating an optical flow diagram based on at least two current face images finally determined; generating a second face image based on a current face image finally determined and the optical flow diagram; and generating the face image for the real face based on the first face image and the second face image; and generating the face image sequence for the real face using the determined face image.

2. The method according to claim 1, wherein the generating a cartoon face contour figure sequence based on the cartoon face image sequence comprises:

for each cartoon face image in the cartoon face image sequence, performing a face keypoint detection on the cartoon face image, and generating each cartoon face contour figure based on detected face keypoints.

3. The method according to claim 1, wherein the generating an optical flow diagram based on at least two current face images finally determined comprises:

inputting the at least two current face images finally determined into a pre-established optical flow estimation model to obtain an optical flow diagram.

4. The method according to claim 3, wherein the pre-established optical flow estimation model is obtained by performing training comprising:

acquiring a training sample set, the training sample set comprising at least two face images and an optical flow diagram corresponding to the at least two face images; and using the at least two face images in the training sample set as an input, and using the optical flow diagram corresponding to the at least two face images as a desired output, to train and obtain the optical flow estimation model.

5. The method according to claim 4, wherein the optical flow diagram comprises motion information of a face.

6. The method according to claim 1, wherein the generating a second face image based on a current face image finally determined and the optical flow diagram, comprises:

inputting the current face image finally determined and the optical flow diagram into a pre-established face generative model, to generate the second face image, wherein the face image generative model represents a corresponding relationship between the current face image finally determined, the optical flow diagram, and the second face image.

7. The method according to claim 1, wherein the generating the face image for the real face based on the first face image and the second face image, comprises:

performing a weighted fusion on the first face image and the second face image, to obtain the face image for the real face.

8. A device, comprising:
one or more processors; and
a storage apparatus, storing one or more programs, wherein the one or more programs, when executed by the one or more processors, cause the one or more processors to perform operations, the operations comprising: determining a target cartoon character from a received cartoon-style video according to an operation of a user, performing screen capturing on face images of the target cartoon character in the cartoon-style video to form a cartoon face image sequence for the target cartoon character, and generating a cartoon face contour figure sequence for the target cartoon character based on the cartoon face image sequence for the target cartoon character;

generating a face image sequence for a real face based on the cartoon face contour figure sequence for the target cartoon character and a received initial face image of the real face, wherein a face expression in the face image sequence for the real face matches a face expression in the cartoon face image sequence for the target cartoon character;

generating a cartoon-style face image sequence for the real face according to the face image sequence for the real face; and replacing face images of the target cartoon character in the cartoon-style video with cartoon-style face images in the cartoon-style face image sequence for the real face, to generate a cartoon-style video corresponding to the real face;

wherein the generating of the cartoon-style face image sequence for the real face according to the face image sequence comprises:

inputting a face image in the face image sequence into a pre-established cartoon-style image generative model to generate the cartoon-style face image sequence for the real face, wherein the cartoon-style image generative model is a model trained and obtained based on a machine learning algorithm, or a generative model included in a generative adversarial network (GAN), and the cartoon-style image generative model is used to generate a cartoon-style face image according to the face image of the real face;

wherein the generating a face image sequence for a real face based on the cartoon face contour figure sequence for the target cartoon character and a received initial face image of the real face comprises:

for a cartoon face contour figure in the cartoon face contour figure sequence, performing sequentially following operations of generating a face image: generating a first face image based on a current cartoon face contour figure and face feature information of the initial face image;

determining a face image for the real face based on the first face image by: generating an optical flow diagram based on at least two current face images finally determined; generating a second face image based on a current face image finally determined and the optical flow diagram; and generating the face image for the real face based on the first face image and the second face image; and generating the face image sequence for the real face using the determined face image.

9. The device according to claim 8, wherein the generating a cartoon face contour figure sequence based on the cartoon face image sequence comprises:

for each cartoon face image in the cartoon face image sequence, performing a face keypoint detection on the cartoon face image, and generating each cartoon face contour figure based on detected face keypoints.

10. A non-transitory computer readable medium, storing computer programs, wherein the programs, when executed by a processor, cause the processor to perform operations, the operations comprising:

determining a target cartoon character from a received cartoon-style video according to an operation of a user, performing screen capturing on face images of the target cartoon character in the cartoon-style video to form a cartoon face image sequence for the target cartoon character, and generating a cartoon face contour figure sequence for the target cartoon character based on the cartoon face image sequence for the target cartoon character;

generating a face image sequence for a real face based on the cartoon face contour figure sequence for the target cartoon character and a received initial face image of the real face, wherein a face expression in the face image sequence for the real face matches a face expression in the cartoon face image sequence for the target cartoon character;

generating a cartoon-style face image sequence for the real face according to the face image sequence for the real face; and replacing face images of the target cartoon character in the cartoon-style video with cartoon-style face images in the cartoon-style face image sequence for the real face, to generate a cartoon-style video corresponding to the real face;

wherein the generating of the cartoon-style face image sequence for the real face according to the face image sequence comprises:
inputting a face image in the face image sequence into a pre-established cartoon-style image generative model to generate the cartoon-style face image sequence for the real face, wherein the cartoon-style image generative model is a model trained and obtained based on a machine learning algorithm, or a generative model included in a generative adversarial network (GAN), and the cartoon-style image generative model is used to generate a cartoon-style face image according to the face image of the real face;

wherein the generating a face image sequence for a real face based on the cartoon face contour figure sequence for the target cartoon character and a received initial face image of the real face comprises:
for a cartoon face contour figure in the cartoon face contour figure sequence, performing sequentially following operations of generating a face image: generating a first face image based on a current cartoon face contour figure and face feature information of the initial face image;
determining a face image for the real face based on the first face image by: generating an optical flow diagram based on at least two current face images finally determined; generating a second face image based on a current face image finally determined and the optical flow diagram; and generating the face image for the real face based on the first face image and the second face image; and
generating the face image sequence for the real face using the determined face image.

11. The non-transitory computer readable medium according to claim 10, wherein the generating a cartoon face contour figure sequence based on the cartoon face image sequence comprises:
for each cartoon face image in the cartoon face image sequence, performing a face keypoint detection on the cartoon face image, and generating each cartoon face contour figure based on detected face keypoints.

* * * * *